US011025982B2

(12) United States Patent
Umansky et al.

(10) Patent No.: US 11,025,982 B2
(45) Date of Patent: Jun. 1, 2021

(54) SYSTEM AND METHOD FOR SYNCHRONIZING CONTENT AND DATA FOR CUSTOMIZED DISPLAY

(71) Applicant: TWIZTED DESIGN, INC., New York, NY (US)

(72) Inventors: Jan Umansky, New York, NY (US); Danny Umansky, Ashkelon (IL)

(73) Assignee: TWIZTED DESiGN, INC., New York, NY (US)

( * ) Notice: Subject to any disclaimer, the term of this patent is extended or adjusted under 35 U.S.C. 154(b) by 0 days.

(21) Appl. No.: 16/369,280

(22) Filed: Mar. 29, 2019

(65) Prior Publication Data

US 2020/0314479 A1   Oct. 1, 2020

(51) Int. Cl.
| | | |
|---|---|---|
| *H04N 21/43* | (2011.01) | |
| *H04N 21/431* | (2011.01) | |
| *H04N 21/44* | (2011.01) | |
| *H04N 21/454* | (2011.01) | |
| *H04N 21/4722* | (2011.01) | |

(52) U.S. Cl.
CPC ....... *H04N 21/4305* (2013.01); *H04N 21/431* (2013.01); *H04N 21/44* (2013.01); *H04N 21/454* (2013.01); *H04N 21/4722* (2013.01)

(58) Field of Classification Search
None
See application file for complete search history.

(56) References Cited

U.S. PATENT DOCUMENTS

| | | | |
|---|---|---|---|
| 9,965,900 B2 | 5/2018 | Wojdala et al. | |
| 10,231,033 B1* | 3/2019 | Bumgarner | H04N 21/8547 |
| 2007/0110074 A1* | 5/2007 | Bradley | H04L 65/601 370/395.51 |
| 2011/0321114 A1* | 12/2011 | Newell | H04N 21/234318 725/146 |
| 2014/0143218 A1* | 5/2014 | Sanghavi | G06F 16/48 707/695 |
| 2014/0237523 A1* | 8/2014 | Onishi | H04N 21/242 725/88 |
| 2016/0057488 A1* | 2/2016 | Smolic | H04N 21/44016 725/32 |
| 2018/0324238 A1* | 11/2018 | Melenboim | H04L 65/607 |
| 2019/0191203 A1* | 6/2019 | Asbun | H04N 21/812 |
| 2020/0210329 A1* | 7/2020 | Xu | G06F 12/0646 |

* cited by examiner

*Primary Examiner* — Jason K Lin
(74) *Attorney, Agent, or Firm* — Paratus Law Group, PLLC

(57) ABSTRACT

An interactive media player includes an input interface configured to receive a user input signal, a receiver configured to receive content and data from a server, a synchronizer configured to synchronize the content and the data based on timing information and a self-correcting clock of a user device upon which the media player is included, a graphics overlay processor configured to generate information indicative of a graphics overlay based on the data, and a render engine configured to render the graphics overlay indicating the data synchronized to the content for display on a user interface. The data synchronized to the content is selected based on the user input signal.

31 Claims, 10 Drawing Sheets

SYSTEM AND METHOD FOR SYNCHRONIZING CONTENT AND DATA FOR CUSTOMIZED DISPLAY

TECHNICAL FIELD

One or more embodiments described herein relate to a content delivery system.

BACKGROUND OF THE INVENTION

A variety of systems have been developed to deliver images, video, and other content to users. These systems were traditionally implemented by content providers for broadcast or transmission across one or more networks. Early forms of content delivery systems transmitted pay-per-view programming and on-demand movies. This helped to promote interest in satellite and cable television services.

As the Internet gained popularity, consumer focus shifted to receiving content through web-based streaming. This allowed viewers much greater access to content, mainly because the content could be received on mobile terminals without requiring a cable or satellite subscription. Web-based streaming also allowed for a broader array of content and services to be provided. This helped to promote interest in smart phones, tablets, and other mobile terminals.

Efforts to provide even greater viewing experiences for users have not diminished. One effort involves overlaying graphics on video to provide more information to the user. The graphics are inserted by the content provider (or source) prior to formation of a transport stream. Such an approach requires the content provider to insert metadata into the stream. The use of metadata increases processing overhead, consumes large amounts of bandwidth, and increases costs. Also, users have no control over what data and graphics are delivered with the content, nor are these systems interactive.

SUMMARY OF THE INVENTION

A variety of embodiments are disclosed for delivering, synchronizing, and displaying content and data for customized display on a user device.

One or more of these embodiments synchronize content and data with graphics overlays, after the content has been streamed by the content provider and data has been received from the data provider. Thus, the content provider (or source of the content) is not required to perform the synchronization, or even receive the data, although in other embodiments the content provider may receive or supply the data. Thus, synchronization of the content and data with graphics overlays is performed downstream of the content and data providers. This may reduce overhead, bandwidth, and costs, at least for the content provider, while providing an enhanced viewing experience for users. At least one embodiment performs synchronization based on timing metadata in the received stream and a self-correcting clock, thereby ensuring proper synchronization among content and data and graphics overlays among multiple devices receiving the same content. In one embodiment, the self-correcting clock may be embedded in control software of media player, and thus may be considered to be part of at least one embodiment of the present invention.

These or other embodiments synchronize content and selected data and associated graphics overlays, so that the data and graphics overlays are accurately timed to match the content being displayed at the user device. Such accuracy may be achieved even when different user devices experience different network, operating system, reception, hardware, or other delays. Performing synchronization in this manner is especially beneficial when the content is live broadcast video.

These or other embodiments synchronize the content and data without requiring the content provider (or any other entity) to insert large amounts of metadata into the transport stream. This may reduce overhead, bandwidth, and costs to the content provider. In at least one embodiment, the data provider may also avoid the use of metadata.

These or other embodiments provide an interactive viewing experience, by allowing users to select the content and data to be synchronized and by managing the overlay of graphical objects corresponding to the data over the content on a screen of the user device. Thus, different viewers may view the same content with different data and graphics overlays, thereby providing a customized and interactive viewing experience, all at the control of the user.

While these objectives are beneficial for some applications, the embodiments described herein are not in any way to be limited or be required to achieve any of these objectives. Rather, these objectives are mentioned merely as examples of what benefits may be achieved the embodiments disclosed herein. Moreover, other objective not mentioned herein may become apparent to those of ordinary skill in the art.

In accordance with one embodiment, a media player includes an interactive media player, comprising an input interface configured to receive a user input signal; a receiver configured to receive content and data from a server; a synchronizer configured to synchronize the data and content based on timing information; a graphics overlay processor configured to generate information indicative of a graphics overlay based on the data; and a render engine configured to render the graphics overlay indicating the data synchronized to the content for display on a user interface, the data synchronized to the content selected based on the user input signal.

In accordance with another embodiment, a method for controlling an interactive media player includes receiving a user input signal; receiving content and data from a server; synchronizing the data and content based on timing information; generating information indicative of a graphics overlay based on the data; and rendering the graphics overlay indicating the data synchronized to the content for display on a user interface, wherein the data synchronized to the content is selected by the user input signal.

In accordance with another embodiment, a server includes a multiplexer and a controller. The multiplexer is to generate a transport stream for download to a user device, and the transport stream includes content, first timing information corresponding to the content, data corresponding to the content, and second timing information corresponding to the data. The controller is to download a media player to the user device which includes a synchronizer is to synchronize the data and content based on the first timing information and the second timing information, a graphics overlay processor to generate information indicative of a graphics overlay based on the data, and a render engine to render the graphics overlay indicating the data synchronized to the content for display on a user interface.

In accordance with another embodiment, a method for synchronizing graphics overlay on video includes synchronizing a video stream and data based on timing information and a self-correcting clock of a user device upon which a media player is included; receiving graphics based on the data; and overlaying the graphics on the video stream on a display screen, wherein the data is synchronized to the video stream based on a user input signal.

DETAILED DESCRIPTION

Figure 1:
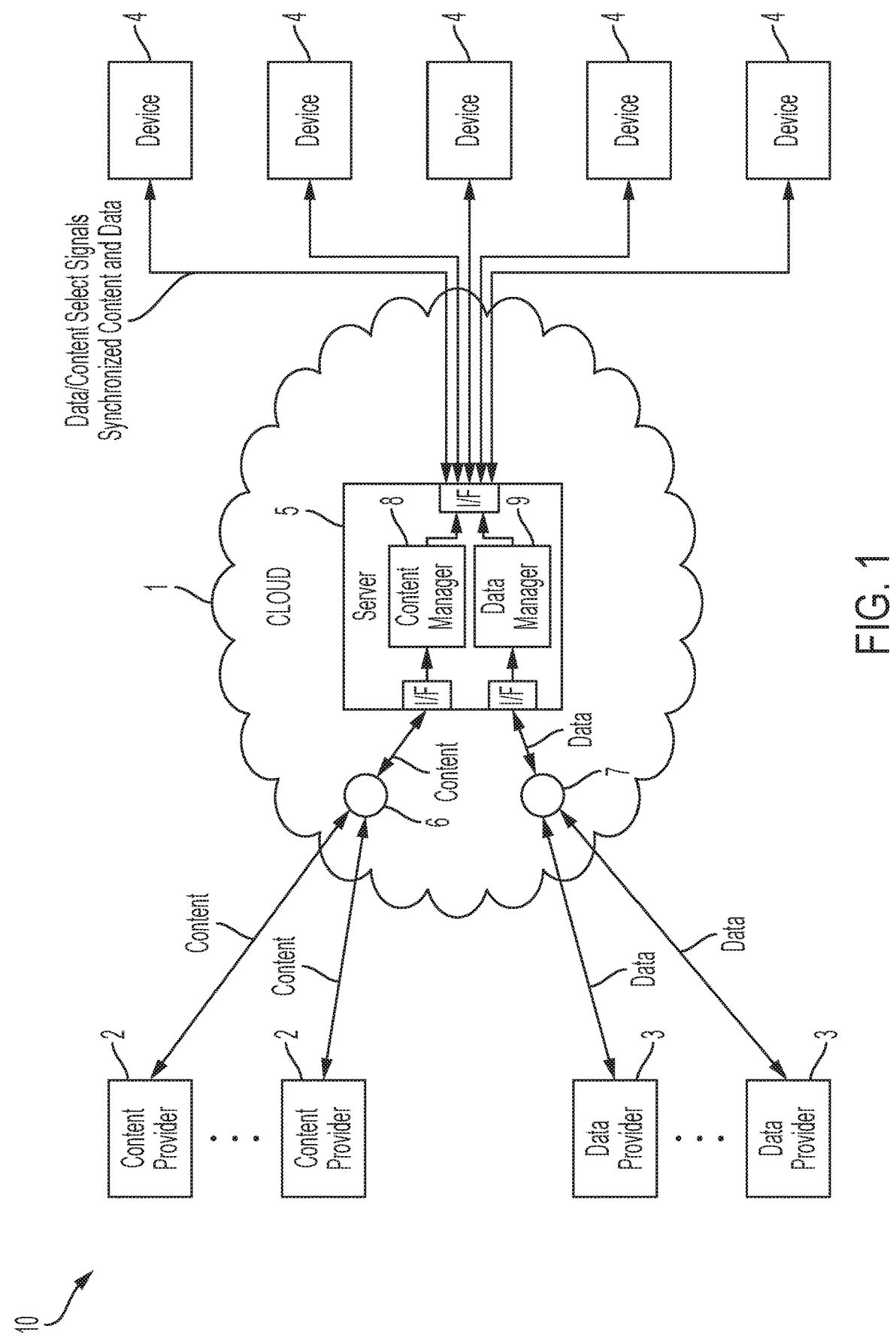
FIG. 1 shows an embodiment of a content delivery system.

FIG. 1 shows an embodiment of a content delivery system 10 which includes a network 1 which delivers information from at least one content provider 2 and at least one data provider 3 to one or more devices 4.

The network 1 may be or include a Cloud-based network. In other embodiments, the network may be implemented on a platform or infrastructure different from what may be referred to as a Cloud. Examples include public networks (e.g., Internet, wide-area networks, storage area networks, etc.), private networks (e.g., virtual private networks (VPNs), local area networks, intranets, etc.), or a combination of public and private networks. Irrespective of the platform or infrastructure, the content delivery system 10 may offer geographically restricted or unrestricted services, e.g., worldwide or at predetermined regional locations. Moreover, the networks may be wired or wireless, or a combination of the two.

The content provider 2 may be any one of a variety of sources of content. For example, the content provider 2 may provide live video of a sporting event, news, television programming, financial reporting, or other information of interest. The live video may be, for example, live broadcast video from a television network (e.g., FOX Sports, NFL Network, UNIVISION, Pay-per-View, etc.) or live streaming website (e.g., Facebook live, YouTube Live, etc.). Other examples of live video include but are not limited to video games, video on demand (VOD), video from a security system (private or commercial), video from hospital procedures or other medical uses, traffic or weather video, and video from space vehicles, telescopes, or other imaging devices.

Additionally, or alternatively, the content provider 2 may provide content other than live video. For example, the content provider may provide video (e.g. movies, website video, etc.) which has been pre-recorded or otherwise stored in a database or server for streaming to users. Other examples of content include 360° images, video or streams, virtual reality or gaming video, interactive presentations, digital signage, and sales and advertising information.

In one embodiment, a plurality of content providers 5 may be included for providing various combinations of the aforementioned types of video, streams, and images to be delivered for display on user devices. Thus, the content delivery system 1 may be well suited to providing subscriber-based content or a platform for monetization.

The data provider 3 may be the content provider 2 or a third-party data source. The data from the data provider 3 may bear some relationship, directly or indirectly, to the content from the content provider 2. For example, when the content is live broadcast video of a sporting event, the data may include performance information relating to teams or players. This information is to be displayed and synchronized to the live video (e.g., frame-by-frame on a real-time or near real-time basis) as the sporting event takes place from start to finish or at selected points during the event. In one application, the sporting event is a car race and the data provider is a company that collects telemetry data from sensors that wirelessly transmit speed, RPMs, location, temperature, and other information relating to the cars in the race.

The data from the data provider 3 may be stored (e.g., in a server or database) for later playback, for example, to give viewers or subscribers a chance to replay the sporting event as it occurred live with all of its attendant data. In other applications, the data may be stock price or financial information, advertising information, statistical information, viewership information, or any other data that may be of interest, and which may or may not relate to the content.

The devices 4 may any of a variety of fixed or mobile user terminals. Examples include televisions, monitors, smart phones, computer tablets, personal digital assistant, netbooks, electronic books, notebook and desktop computers, set top box, navigation devices, electronic cameras, or other electronic devices that have network connections and displays (or connections to displays) for viewing data that is to be synchronized to the content. In one embodiment, at least one of the devices 4 may be a server of another network.

Each of the devices 4 may have an input device for allowing users to make selections as to what type(s) of data are to be synchronized with the content being displayed. The input device may be a touch screen capable of selecting items from a displayed menu, listing, for example, the types of data that may be synchronized with the content. Other input devices may include, for example, a mouse, TV remote controller, or application on a smart phone or other mobile terminal.

The ability to allow the user of each device 4 to select the number and type(s) of data to be synchronized to the content allows for a customized viewing experience. For example, the user of one device 4 may select different data to be synchronized to the content than the user of another device. In the example, one viewer may have a favorite driver and therefore may select the speed and location of the car of that driver to be synchronized with live video of the race. Another viewer may have interest in another driver and may select the speed and location of the car of that driver to be synchronized with the same or different live video. Similar selections of data to be synchronized with the content may be performed for sports, soccer games, stock prices, video games, 360° images, or any of the other forms of content and data discussed herein.

In one embodiment, users of the devices 4 may select the content as well as the data. This may occur, for example, when television broadcast networks have placed cameras as different locations at an event. For example, FOX Sports may place cameras in different cars in a race. The users of devices 4 may select the camera feed from a specific car as the content, in addition to the data corresponding to that specific car to be synchronized for display. Again, this may be accomplished through appropriate selections from a screen menu or other input device.

In one embodiment, a media player in each user device 4 may synchronize the content and data, as received from a server 5 in the network 1. Referring again to FIG. 1, the server 5 receives the content and data from the content providers 2 and data providers 3 through appropriate network connections and interfaces I/F. For example, the content and data may be received from the content providers 2 and data providers 3 directly, through one or more other servers (or network nodes) 6 and 7, respectively, or through the same server or network node 6 or 7. The server also receives data selections and/or content selections from the user devices 4, either directly or indirectly. Based on this information, the server 5 delivers the content and selected data for customized display. The server 5 may be, for example, a Hypertext Transfer Protocol (HTTP) server or another type of server.

The server 5 includes a content manager 8 and a data manager 9.

The content manager 8 decodes, or transcodes, the content from the content provider 2, and then processes the content for delivery to one or more of the user devices 4. The processing performed by the content manager 8 may include, for example, filtering or repackaging packets of content (e.g., frame data), performing error check and correction (ECC), multiplexing, appending or otherwise combining packets with addressing, routing or other control information required for content delivery or the media players in the user devices 4, and/or encoding/compressing the processed content into a format compatible with the user devices 4.

Examples of the encoding that may be performed by the content manager 8 include, but are not limited to, H.264, H.264 and MPEG-H Part 2 (commonly referred to a High Efficiency Video Coding (HEVC)), On2 VP6, Sorenson Spark, Screen video, Screen video 2, motion picture experts group (MPEG) 2 (MPEG-2), MPEG-4 Part 2, a Digital Video Broadcasting (DVB) format, or a Digital Multimedia Broadcasting (DMB) format. The content manager 8 may also support one or more audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The content manager 8 may optionally perform an inspection of timing information for the content packets (or frame data) for synchronization purposes, and/or may store the raw or processed content in a database for delivery to user devices at a later time, e.g., for playback. The content manager may selectively filter the content for delivery to a user device. This operation may be performed, for example, in response to a select signal from a user device 4. The select signal may designate, for example, that only a certain type or subset of content (e.g., video from a specific camera feed from the content provider 2) be delivered to a user device 4.

In one embodiment, the content manager 8 may simply perform a pass-through operation of the content to the user devices 4, with relatively little processing (e.g., encoding or transcoding).

The data manager 9 may perform similar features with respect to the data received from a data provider 3. Depending on the type of data, the processing performed by the data manager 9 may be far less intensive than the processing performed by the content manager 8. To the extent that the data manager 9 performs repackaging of data packets, the size of the data packets may be smaller than the size of the content packets, in order to allow for synchronization between the content and data.

The content from the content providers 2 and the data from the data providers 3 are sent to the server 5 with timing information, which, for example, may be in the form of time codes or time stamps. The timing information may be included in the content (e.g., video stream) provided by the content provider 2 and the data provider 3. This timing information allows for the content and data to be synchronized for display on the user devices 4. Because of the different amounts of processing performed for the content and data throughout the content delivery system 10 (which may or may not include the processing performed by the content manager 8 and the data manager 9), the data may arrive at the server 5 and/or the user devices 4 before the content. The same is true at each of the user devices 4. This time difference (or delay) may be leveraged for synchronizing display of the data with the content on each media player.

Figure 2:
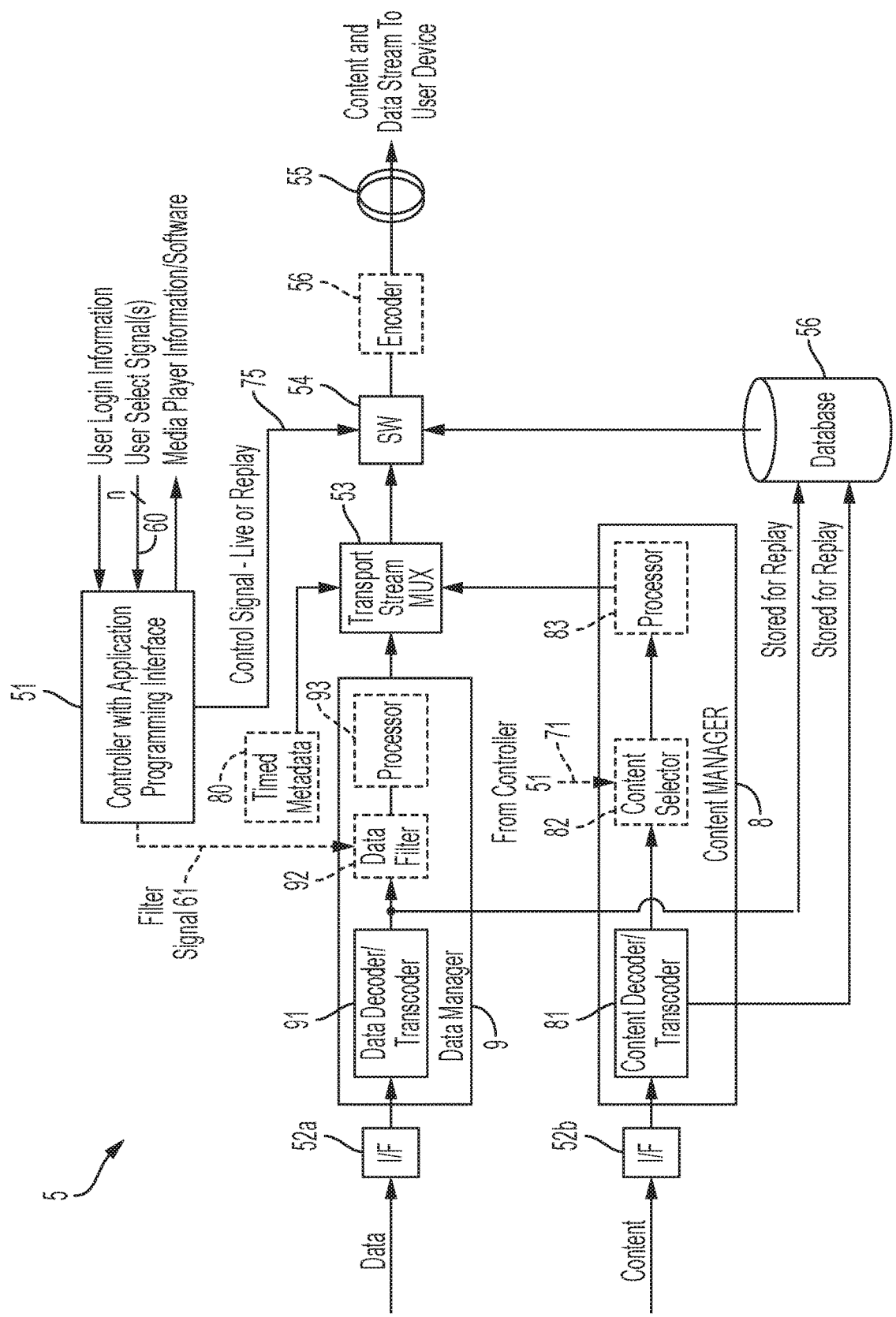
FIG. 2 shows an embodiment of a server in the content delivery system.
Figure 3:
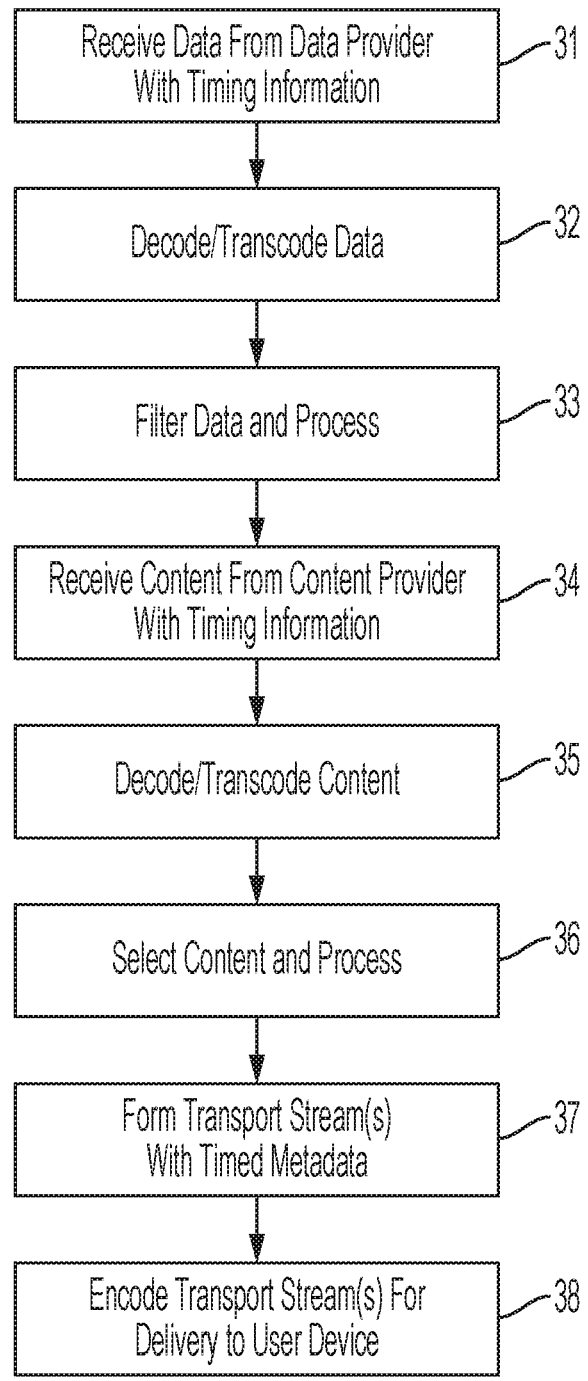
FIG. 3 shows an embodiment of a method for delivering content and data.

FIG. 2 shows an embodiment of the server 5 which includes a controller 51, interfaces (I/F) 52a and 52b, a transport stream multiplexer (MUX) 53, a switch 54, and an output 55. The server also includes the content manager 8 and the data manager 9, which will be discussed in greater detail below. FIG. 3 shows an embodiment of a method for delivering content and data from the server 5, which will be discussed in tandem with the embodiment of FIG. 2.

The controller 51 performs overall management functions of the server 5. These functions include user registration and authentication, downloading, configuring and updating media player software on user devices 4, processing user requests, selections, and other information, and controlling the filtering, multiplexing, and/or streaming of content and data to user devices, along with advertisements, promotions, alerts, notifications, and other information. The controller may include, or be coupled to, a memory (or other computer-readable media) for storing operating system programs to implement these functions. The controller may also be responsible for performing accounting and billing in association with user subscriptions or delivered content and data.

The controller 51 also includes, or maintains, an application programming interface (API) for the user devices 4. The API may generate data structures (which may be referred to as graphic events) containing data from one or more of the data providers 3, as well as other information for synchronizing the data with the content for display on a user device. An example of a data structure for a graphic event is discussed below. In one embodiment, the graphic events may be created in the user device 4 instead of the server 5.

Data Stream Processing

Interface 52a receives data from at least one of the data providers 3 (Block 31). In one embodiment, interface 52a receives all of the data from the data provider 3 relating to the content from the content provider 2. The data may be received in packets containing a header and payload. The header may include, for example, information identifying the data provider 3 (or data provider/source IP address), timing information, information indicating the type of data in the payload, error detection and correction (e.g., parity) information, packet or payload length information, and/or priority information. This information may be stripped off by a parser in the data manager and used by the controller 51 for purposes of controlling the delivery and/or archiving of the data, as well as for performing routing and/or other operations.

The timing information in the data packet headers may be used by the media player to synchronize the data with the content for customized display. The timing information may therefore be considered to define certain events relating to the content. For example, when the content is a sporting event, the timing information may be used as a basis to synchronize data to an action taking place in a particular frame of video. In the present embodiment, the synchronization is performed in the media player. In another embodiment, all or a portion of the synchronization may be performed by server 5.

The timing information may be, as stated, time codes or time stamps or other information corresponds to the action or events in the content. In one embodiment, the timing information (e.g., time stamp) may be converted (in server 5 or user device 4) to a predetermined time format, e.g., Universal Time Code (UTC) in milliseconds (Unix time). For live broadcast video, the server 5 may send the data, for example, with the current UTC time (system) plus a predetermined constant delay (optional or may be negative) to compensate for various factors, e.g., packaging time, system time offset etc. For other types of content (e.g., Video on Demand), the server 5 may send the data, for example, with a current video time. The events defined by the timing information in the data may be used as a basis for triggering the generation and/or overlay of certain graphics on the content displayed by the media player.

The data manager 9 may include a decoder/transcoder 91, a data filter 92, and a processor 93. The data filter 92 and processor are optional and therefore have been indicated by dotted boxes in FIG. 2. The data manager may also include one or more buffers for temporarily storing the data during filtering and/or processing.

The decoder 91 decodes the data received through the interface 52a from the format used by the data provider 3 into a format for processing or delivery (Block 32). For example, the decoder 91 may simply decompress the data packets received through the interface or may decode the data packets for filtering and processing. If no filtering and processing is to be performed, the transcoder 91 may transcode the data received through the interface 52a into a format compatible for delivery to one or more of the user devices 4.

All of the decoded or transcoded data is stored in a database 56 or other storage area in or coupled to the server 5. The data is stored, for example, so that it may be delivered to one or more user devices 4 at a later time for play back in synchronism with the content, which may also be stored in database 56 or another storage device. In one embodiment, the data received through interface 52a may be stored in database 56 before being input into decoder/transcoder 91.

When the data filter 92 is included in the data manager 9, the data filter 92 may filter one or more subsets or types of information from the data. This may allow the amount of data to be delivered to the user device 4 to be significantly reduced, thereby making more efficient use of available network bandwidth and reducing the processing burden on the user device 4. The data filter 92 may filter the data based on a filter signal 61 from the controller 51. The filter signal instructs the data filter 92 to output only the type of data indicated, for example, in a user select signal 60 received by the controller 51.

The user select signal 60 is received from a user device 4 and is indicative of the type or subset of data a viewer of the user device 4 would like to see when viewing the content on the media player. For example, when the content is video of a race, the user input signal 60 may inform the controller 51 that the speed and location of a particular driver is to be viewed on the media player. In this case, controller 51 generates filter signal 61 to instruct the data filter 92 to output only the data corresponding to the speed and location of the particular driver, and to omit output of other data corresponding to the race included in the data received from the data provider 3.

The data filter 92 may perform this filtering operation based on information in the headers of the data packets, as previously described. For example, the headers of relevant data packets may have certain flag or bit information indicative of the speed and location of a particular driver. The data filter 92 may parse, or access, this flag or bit information from the headers and output the payloads of the data packets for delivery to the user device 4 (Block 33).

When the processor 93 is included in the data manager 9, the processor 93 may perform, for example, parsing, re-packeting, error detection and correction, prioritizing, or other operations to place the data in a format suitable for delivery to and synchronizing with the content by the media player in a user device 4. For example, in order to ensure that the data packets are smaller than content packets for purposes of achieving synchronization, the processor 93 may form new, smaller packets from the data packets in the initial data stream received by interface 52a.

When the data filter 91 and processor 93 are not included in the data manager 9, the data may be routed (e.g., in uncompressed form) to the transport stream multiplexer 53 so that it may be combined with the content for delivery to the user terminal. In one embodiment, the data does not even have to be decoded, provided it is in a format suitable for delivery and interpretation by the media player at the user device 4.

The following is an example of a data structure which may be received from a data provider 3, or which may be created by the API of controller 51 based on data received from a data provider 3. The data structure may correspond to data to be displayed in synchronism with content (e.g., one or more associated frames of video) on a user device 4. In one embodiment, these data structures serve as graphic events for triggering graphic overlays in a manner to be described in greater detail below.

```
{
    "target" : "id-12345",
    "data" : {
        "speed" : "120 MPH",
        "RPM" : "4200"
    },
    "timecode" : 1512754650683
}
```

In the data structure (or graphic event) above, "target" identifies the endpoint of the event (or associated content). The "target" may be used by the API to perform control and processing based on the data structure.

The data structure also includes "data" which controls the graphics to be overlaid on the content. In one embodiment, this data is sent to all the media players that requested to receive the content. The "data" may include the actual data to be displayed directly on a media player of the requesting user devices 4 and/or may include information to be used by internal logic of the media player for performing graphics overlay. In the example above, the data to be used to generate the graphics overlay and/or which is to be displayed in synchronism with content corresponds to a car going 120 MPH and 4200 RPMs at a specific frame or frames of streamed video. In one embodiment, the target id may be for the graphic element to be displayed on the screen, e.g., Target: "header", data : {title: "some title"],
Target: "footer", data : {text: "some text"}

The data structure also includes timing information in the form of a "timecode," which represents the video time in which the event should be executed. For Video on Demand, the timecode may be a time between 0 and the duration of the video. For live video, the timecode may be a Unix timestamp with millisecond precision. The timing information may be a different type of time information in another embodiment.

The data structures (graphics events) may be created by the Application Programming Interface of the server 5 or the user device (e.g., the media player of the user device), or both, for purposes of synchronizing data with the content. When the API creates the data structures, the media player of the user device may parse information in the data structures from the input stream and synchronize display of the content and data in a manner to be described in greater detail below.

When a graphics event is created, it may be saved in a database (e.g., database 56 or another storage device) for distribution to all open players which have requested to receive the content associated with the data.

Content Stream Processing

The interface 52b receives content from one of the content providers 2 (Block 34). The content may be received in packets with time codes, time stamps, or other timing information in their headers. When the content is an image or video, the payloads of the packets may be combined to form image or frame data that is to be synchronized with the content in the media player at the user device 4. The content headers may also include, for example, information identifying the content provider 2 (or data provider/source IP address), and/or information indicating the type of video (e.g., a particular camera feed when the content is generated by multiple cameras, error detection and correction (e.g., parity) information, packet or payload length information, and/or priority information). This information may be stripped off by a parser in the content manager 8 and used by the controller 51 for purposes of controlling the delivery and/or archiving of the content, as well as for performing routing and/or other operations.

When the content is received as a live video stream, the stream may include two parts, a manifest and video chunks. A manifest is a file that describes the video received from a data provider 3 and that points to the video chunks. The manifest may also include information indicative of video encoding, codecs, duration, and other metadata received from the data provider 3. In addition, the manifest may include one or more universal resource locators (URLs) of the video chunks and information indicating the order of their playback. In one embodiment, the manifest may include URLs of only the next few video chunks to be played. In one embodiment, if there is not tag indicating that the manifest has ended (e.g., #EXT-X-ENDLIST), the media player may download the same manifest again, which may have new video chunk URLs. When the content is Video on Demand (VOD), the manifest includes the URLs of all the video chunks.

The content manager 8 may include a decoder/transcoder 81, a content selector 82, and a processor 83. The content selector 82 and processor 3 are optional and therefore have been indicated by dotted boxes in FIG. 2. The content manager may also include one or more buffers (or storage areas) for temporarily storing the data during selecting and/or processing.

The decoder 81 decodes the content received through the interface 52b from the format used by the content provider 3 into a format for processing or delivery (Block 35). For example, the decoder 81 may simply decompress the content packets received through the interface 52b or may decode the content packets for selection and processing. If no selection and processing is to be performed, the transcoder 81 may transcode the content received through the interface 52b into a format compatible for delivery to one or more of the user devices 4.

All of the decoded or transcoded content is stored in a database 56 or other storage area in or coupled to the server 5. The content is stored, for example, so that it may be delivered to one or more user devices 4 at a later time for play back in synchronism with the data, which may also be stored in database 56 or another storage device. In one embodiment, the data received through interface 52b may be stored in database 56 before being input into decoder/transcoder 81.

When the content selector 82 is included in the content manager 8, the content selector 82 may select one or more types of content (e.g., video from one or more camera feeds, camera angles, etc.) from the content stream (Block 36). This may allow the amount of content to be delivered to the user device 4 (which may be intensive) to be significantly reduced, thereby making more efficient use of available network bandwidth and reducing the processing burden on the user device 4. The content selector 82 may select the content based on a selector signal 71 from the controller 51. The selector signal 71 instructs the content selector 82 to output only the type of content indicated, for example, in the user select signal 60 or other information received by the controller 51.

The user select signal 60 or other information may be received prior to delivery of the content and data to the user device 4, during delivery of the content and data to the user device 4, or both. This may occur, for example, when the user wants to change the type of content or data displayed on the media player.

When the processor 83 is included in the content manager 9, the processor 83 may perform, for example, parsing, re-packeting, error detection and correction, prioritizing, or other operations to place the content in a format suitable for delivery to the media player in a user device 4. For example, in order to ensure that the data packets are smaller than content packets for purposes of achieving synchronization, the processor 83 may form new, larger packets from the content packets in the initial content stream received by interface 52b, if necessary.

The transport stream multiplexer 53 multiplexes, or combines, content packets and data packets output from the content manager 81 and the data manager 91, respectively, into an integrated stream for delivery to a user device 4. When the content is a live video stream or video on demand, the data may be multiplexed with the manifest(s) and corresponding video chunks. The transport stream multiplexer 53 also multiplexes, or inserts, timed metadata 80 into the stream. In one embodiment, the timed metadata may be inserted into the manifest(s) or one or more of the video chunks as received by the content provider or by the application programming interface of the controller 51 (Block 37). In this case, a separate storage device for the timed metadata 80 may not be included and the processor 83 of the content manager 8 may output the timed metadata to the transport stream multiplexer 53. The timed metadata will be used by user device to synchronize the content and data for customized display.

The following is an example of a manifest file for a live video stream into which timed metadata has been inserted. In this example, the manifest indicates five video chunks, each of which is about 8 seconds in duration. The timed metadata appears on the fourth line as a #EXT-X-PROGRAM-DATE-TIME (PDT) tag. The PDT may indicate the real time of the live video and may be inserted at a predetermined location in the manifest file.

EXTM3U
EXT-X-VERSION:3
EXT-X-TARGETDURATION: 8
EXT-X-PROGRAM-DATE-TIME:2018-05-15T07:26:12.267Z
EXT-X-MEDIA-SEQUENCE:0
EXTINF :8.683333,
videochunk00000.ts
EXTINF:8.341667,
videochunk00001.ts
EXTINF:8.341667,
videochunk00002.ts
EXTINF:8.341667,
videochunk00003.ts
EXTINF:6.072733,
videochunk00004.ts In the example above, the PDT tag is inserted before the video chunks to describe the real world time that the video chunk was broadcast from the content provider 2. The timed metadata, therefore, provides an indication of the order in which the video chunks for display, and may be included in the content received by the content provider 2 and stored in a storage device 80, once it is separated from the input content stream. In another embodiment, the API may generate the timed metadata by analyzing the received content stream and the order and broadcast time of the video chunks. The PDT tag may be inserted at a different location in the manifest file (e.g., before some video chunks and after others) in another embodiment.

The timed metadata may be different in another embodiment. For example, the timed metadata may be an ID3 tag encoded into the video chunks themselves. In one embodiment, the multiplexer 53 may be omitted and separate content and data streams may be delivered to a user device 4. The separate streams may be delivered over different channels of output 55.

The multiplexed or separate content and data are passed through a switch 54, which is controlled based on a control signal 75 from the controller 51. When the content is live broadcast content (or some other form of live streaming), the switch 54 passes the content and data from the content and data managers (e.g., through multiplexer 53) for delivery. When the content is pre-recorded or pre-stored, the switch passes the content and data from the database 56 for delivery. The switch may be considered to be an optional feature.

The output 55 of the server 5 may conform to a protocol which is able to provide a continuous connection to a user device 4, e.g., without requiring push notification or other initiation from that device. One example of such a protocol is Web Socket. This protocol provides full-duplex communication channels over a single TCP connection, and thus may be suitable for streaming content and data to the media player of a user devices 4. Because Web Socket supports duplex communications, the user select signal 60 and other information from subscribers or users may be transmitted to the server 5 through a Web Socket channel. One or more Web Socket channels may be used to download the initial media player software, media player software updates, and/or other information. Output 55 may be a different type of connection or conform to a different type of protocol in another embodiment.

An encoder 56 may be located between switch 54 and output 55. Encoder 56 may perform additional compression or encoding, if necessary, in order to be compatible with the type of user device 4 and/or the decoder of the media player installed in the user device 4 (Block 38). The encoder 56 may include a plurality of different encoders to allow server 5 to communicate with different types of user devices, with media players having different types of decoders, and/or which receive information using different protocols.

Figure 4:
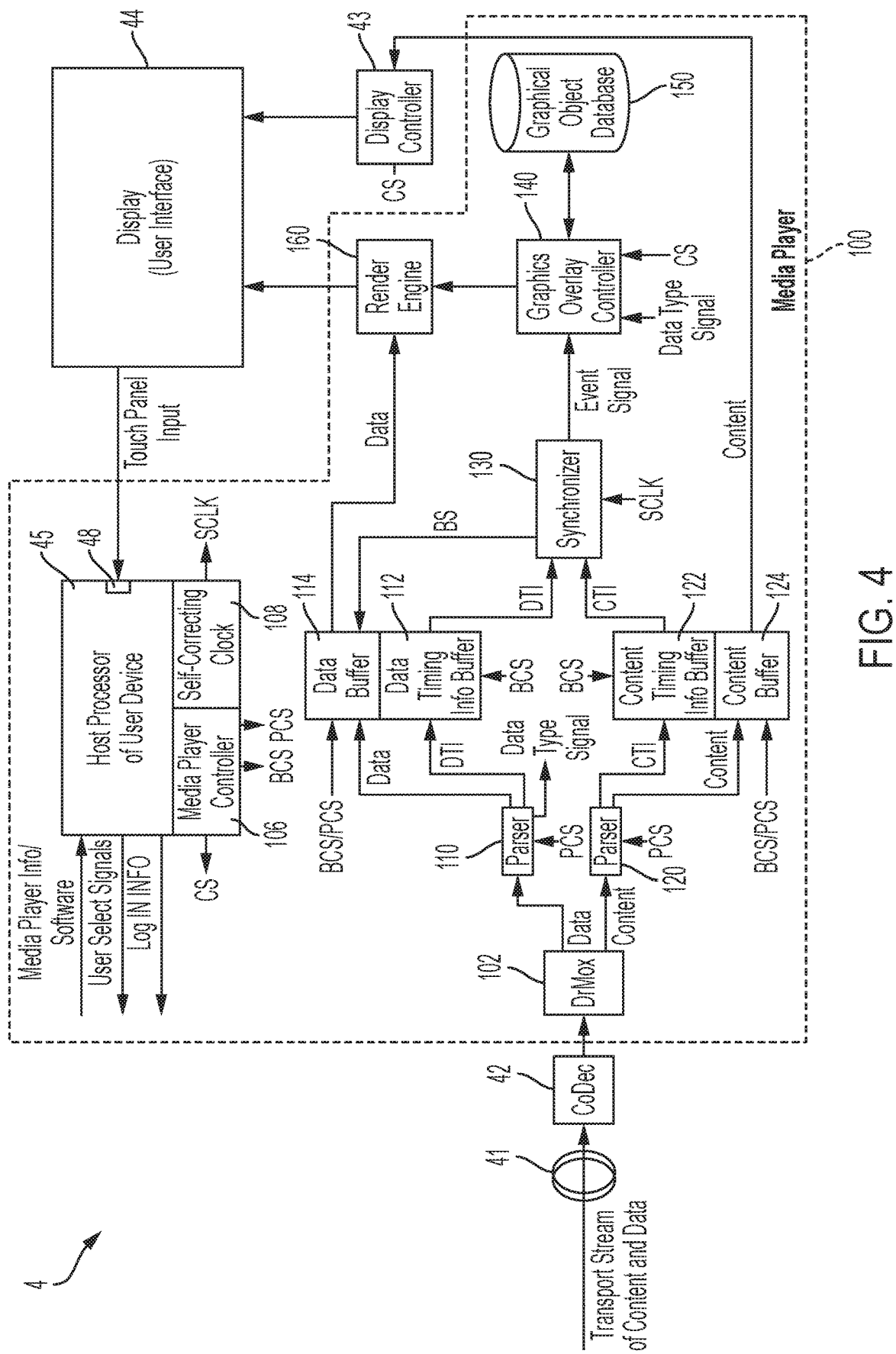
FIG. 4 shows an embodiment of a user device including a media player.
Figure 5:
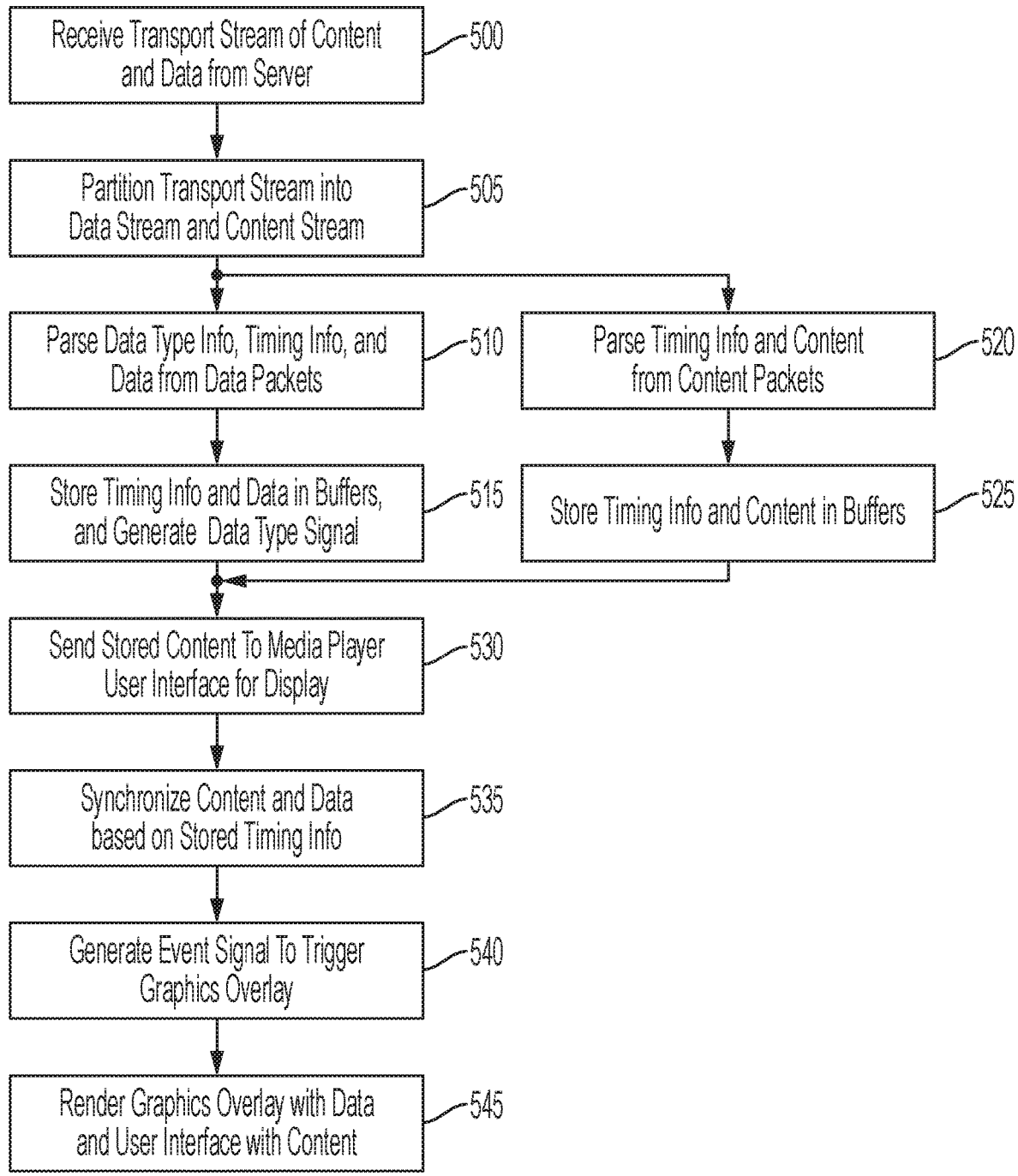
FIG. 5 shows an embodiment of a method for synchronizing content and data.

FIG. 4 shows an embodiment of a user device 4 including an input (or receiver) 41, a decoder/encoder (CODEC) 42, a display controller 43, a display 44, a host processor 45, and a media player 100 for displaying content and data from a media player 100. FIG. 5 shows operations included in an embodiment of a method for providing synchronized content and data on a media player in the user device 4 of FIG. 4.

Referring to FIGS. 4 and 5, the input 41 of the user device 4 receives the transport stream of content and data output from the server 5 (Block 500). As previously discussed, the content and data may be multiplexed in the transport stream or may be received on separate physical or logical channels. When the API of the server 5 creates graphics events, data structures as previously described may be received through input 41, along with timed metadata in the content portion of the stream. The input 41 may conform to the protocol of output 55 of server 5 (e.g., Web Socket), or a different protocol when, for example, a protocol change has occurred along the signal path between the server 5 and the input device 4.

The CODEC 42 decodes the transport stream into a format suitable for processing by the media player 100. This may include decompression, demodulation, filtering, sampling, and/or other techniques.

The display controller 43 controls the display of content and data output from the media player, as well as other information to be displayed on display 44.

The display 44 may be any type of display including, but not limited, to a liquid crystal display, an organic light emitting diode display, and a light emitting diode display. The display 44 may include a touch panel for data input, or data and information may be input through a mouse or other input device of the user device 4.

The host processor 45 manages one or more operations of the media player 100, and thus may include a media player controller for this purpose. The media player controller may, for example, control the generation and overlay of graphics on video content output for display by the media player 100. The graphics may be, for example, fixed, dynamic, and/or interactive graphics of a type generated by a web developer tool. One example is HTML 5 graphics, but other types of graphics may also be implemented.

Additionally, the host processor 45 may provide or maintain a self-correcting clock 108 for synchronizing or controlling operations of one or more features of the media player 100. The host processor 45 may be the central processing unit of the user device and thus may control operations unrelated to the media player 100. In one embodiment, the self-correcting clock may be embedded in the control software of the media player (e.g., included in the media player controller), and thus may be considered to be part of at least one embodiment of the present invention.

Interactive Media Player

The media player 100 outputs the content and data from server 5 in a customized and interactive manner for viewing by a user. This is accomplished by synchronizing the data with the received in the input transport stream, and then outputting the synchronized data and content for display with one or more graphics overlays. The data may be selected by a user input signal received by the media player. The user input signal may select the specific type(s) of data (e.g., less than all data received) that is to be synchronized to the content. The user input signal may be received through one or more inputs 48 of the host device 45 or media player controller. The overlays may be in an active region of the display screen, so that there are selectable by a user for editing, as discussed in greater detail below.

In one embodiment, the media player 100 may be connected to a Publish/Subscribe system on the server 5 through a Web Socket connection. This may enable, for example, real-time communications to be performed with the server 5, so new data/content are pushed to the media player of multiple user devices 4 simultaneously connected to server 5.

The media player 100 includes a demultiplexer 102, a data parser 110, and a content parser 120. The demultiplexer 102 partitions the input transport stream into separate data and content signal paths connected to the data parser 110 and the content parser 120, respectively (Block 505). This operation may be performed, for example, based on identification or other information contained in the headers of the content and data packets in the input stream. The multiplexer may be considered to be an optional feature and may be included when the server 5 multiplexes the content and data for delivery to the user device.

When the server 5 delivers the content and data to user device 4 in a different way (e.g., along separate channels of a WebSocket connection), the demultiplexer 102 may not be needed. Instead, the data parser 110 and content parser 120 may respectively receive the data and content from the channels, vis-á-vis the CODEC 42.

The data parser 110 parses, or strips off, information from data packets output from the demultiplexer 102 (Block 510). This information may include data type information, timing information (DTi), and the payload data (data). When graphics events are generated in the server 5, the information stripped off by the data parser 110 may include the information of the data structures, e.g., "data" and "timecode" as previously described.

The data parser 110 may generate a data type signal based on information in a data type field of the header of each data packet or information in the data structure. For example, when the content is live video of a car race, the information in the data type field (or data field in the data structure) may indicate that the data in the packet corresponds to the speed, RPMs, or some other form of data for a particular car. Additional header fields may indicate other relevant data, e.g., car number having that speed. The data type signal may be used, for example, to control graphics overlay.

In addition to generating the data type signal, the data parser 110 outputs timing information in a header field of each data packet to a data timing information buffer 112 and data in the payload of each data packet to a data buffer 114 (Block 515). The data timing information in buffer 112 is logically related to or otherwise stored in association with the data stored in buffer 114. Thus, for example, buffers 112 and 114 may collectively form a look-up table or queue. Data stored in the data buffer 114 may be retrieved by referencing its associated timing information stored in the data timing information buffer 112. In one embodiment, a same buffer with different storage areas may store the timing information and data.

The timing information in each data packet indicates the specific point in time when the data in that packet occurred in the content. Consider, for example, the case where a data packet includes header information indicating Car 42 and timing information indicating 33 minutes, 42 seconds, and data indicating 123 mph. Such a packet, therefore, indicates that Car 42 had a speed of 123 mph at 33 minutes, 42 seconds, into the race. The timing information may serve as a basis for synchronizing the data and content, the latter of which has a frame with the same timing information.

The timing information may be a time stamp, time code, or other timing information as previously described. For a live video stream, the timing information may be in one of various formats including but not limited to:
EXT-PROGRAM-DATE-TIME
ID3 Tag
SMPTE Time Code Because the content packets are larger than the data packets and because more processing is performed for the content packets than the data packets, a delay exists between the data packets and content packets. As a result, the data packets will arrive earlier than the content packets. This delay may be used as a basis for synchronizing the data and content and associated graphics overlays output by the media player 100 for display. The data timing information buffer 112 stores timing information that will be used to trigger a graphics overlay event based on data stored in the data buffer 114.

The content parser 120 parses, or strips off, information from content packets output from the demultiplexer 102 (Block 520). This information includes timing information (CTi) and its associated content. In one embodiment, the timing information may correspond to the timing and other information in the manifest portion of the timed metadata in the received stream and the associated content may correspond to the video chunks indicated in manifest portion of the timed metadata. The timing information for each content packet or timed metadata is stored in a content timing information buffer 122 and the content is stored in a content buffer 124 (Block 525). The content stored in the content buffer 124 may be output continuously to the display controller 43, in order to provide uninterrupted display of content on a user interface (Block 530). In one embodiment, a same buffer with different storage areas may store the timing information and content.

The data stored in the data buffer 114 may be not be output continuously, but rather may be output upon the occurrence of certain events as determined, for example, by the corresponding data timing information. This may be understood by the following example. Consider the case where the content is live video. The data for the live video may not change for every frame of the video. The transport stream from the server 5 may therefore not include data for every video frame. In one embodiment, data may only be included in the transport stream when the data changes. Thus, one item of data may correlate to many video frames. In this case, data may be output from the buffer 114 only when the timing information corresponds to a current video frame that is to be displayed.

In one embodiment, the media player controller 106 may generate one or more parser control signals PCS to control the parsing operations (e.g., type rate, and other operations for parsing) performed by one or more of the data parser 110 and content parser 120. The media player controller 106 may also generate one or more buffer control signals BCS to control the buffering (e.g., type, duration, output, storage management, data organization and control, etc.) performed by all or portion of the buffers 112, 114, 122, and 124. For example, through the PCS and/or BCS signals, the media player controller 106 may aggregate, consolidate, or sort data and/or content corresponding to similar events to be triggered, remove data and/or corresponding to previous events (e.g., ones already synchronized), and/or delete data and/or content in the buffers corresponding to events that are not needed or otherwise selected. In one embodiment, the data timing information buffer 112 may therefore be referred to as a sorted event container.

Because the data is not continuously output from the data buffer 114 (e.g., is not output for each video frame of content), the gaps in time between when consecutive data is output from the data buffer 114 may be compensated, for example, using an internal timer. The internal timer may be started when timing information stored in the data timing buffer 112 indicates that associated data stored in data buffer 114 is to be output, as determined by a synchronizer 130. The internal timer may time out and re-start with the next timing information in the data timing information buffer 112.

In one embodiment, the internal timer may be the self-correcting clock 108 that compensates for other code run time starts and that runs from the provided timecode. Each new video data, or frame, may correspond to a new timecode that is used as a basis for updating and synchronizing the self-correcting clock 108. An example of the self-correcting clock and its operation will be discussed in greater detail below.

The timing information stored in the data timing information buffer 112 may therefore be considered to define or trigger "events," e.g., times when new or changed data is to be output (with a corresponding graphics overlay) for content having the same timing information. The graphics events may be created by the media player controller 106 or by server 5 in the manner previously described. The storage of timing information in the data timing information buffer 112 and the data in the data buffer 114 may be managed by the media player controller 106.

In one embodiment, when the media player 100 is opened or video currently being viewed is scrubbed by a user (e.g., when the content is Video on Demand), the media player controller 106 may control pulling of the saved information in the data timing information buffer 112 up to the current video time. In one embodiment, the information in buffer 112 may be sequentially stored in the buffers to represent the current data state. For example, when the content is a car race, the following information may be stored in buffer 112 based on information in the data structures received in the input stream.

Timecode Sorting Example

```
{
    "target" : "car-123",
    "data" : {
        "speed" : "0 MPH",
        "car" : "Formula-1"
    },
    "timecode" : 0
}
{
    "target" : "car-123",
    "data" : {
        "speed" : "31 MPH",
    },
    "timecode" : 4000
}
{
    "target" : "car-123",
    "data" : {
        "speed" : "64 MPH",
    },
    "timecode" : 7000
}
```

In the above example, the data timing information buffer 112 stores speed and RPM data for car number 123 at respective timecodes 0, 4000, and 7000, that is, 0 seconds, 4 seconds, and 7 seconds into the video. When the content is VOD and the user scrubs from 0 seconds to 6 seconds (e.g., to timecode 6000), the data stored in data buffer 114 and the information stored in buffer 112 for timecodes 0 and 4000 are deleted, so that the buffers will be kept consolidated and up to date. In the example discussed above, when scrubbed to 6 seconds, data timing information buffer 112 will therefore only store received data timing information and data buffer 114 will only store data for 6 seconds and thereafter. These management functions may be performed, for example, by the media player controller 106.

The media player 100 also includes a synchronizer 130, a graphics overlay controller 140, a graphical object database 150, and a render engine 160.

The synchronizer 130 synchronizes the data stored in the data buffer with the content stored in the content buffer 124 based on a comparison of the timing information DTi and CTi (Block 535). As previously discussed, the data for a particular time code arrives in advance of the content for that time code. Accordingly, the timing information DTi for the first or next data stored in the data buffer 114 is output to the synchronizer 130, which temporarily holds this information in a storage area. The synchronizer 130 may receive the timing information DTi and/or CTi from the associated buffers 112 and 114 at a predetermined fetch timing, which, for example, may be a predetermined number of milliseconds.

In one embodiment, the synchronizer 130 may implement a polling scheme which involves polling the buffers 112 and 122 to compare timing information DTi and CTi to find a match. For example, every video frame, the synchronizer 130 may poll the data timing information buffer 112 to determine whether data has been stored in data buffer 114 for the current video timecode. The current video timecode may be obtained from the self-correcting clock 108, as described below. The synchronizer 130 then determines whether there is a matching timecode stored in the content timing information buffer 122.

Based on the timing provided by the self-correcting clock 108, the synchronizer 130 continues to compare the data timing information DTi with the content timing information CTi, which lags behind the data. When the data timing information DTi matches the content timing information CTi (e.g., when the time codes of the data and content are the same), the synchronizer 130 outputs a buffer signal BS to the data buffer instructing the buffer to output the data corresponding to the matched data timing information DTi. In one embodiment, an operation for getting graphics events for a timecode is explained in greater detail below.

When there is a match between the data timing information DTi and content timing information CTi, the synchronizer also outputs an Event signal to the graphics overlay controller 140 (Block 540). The Event signal triggers the graphics overlay controller 140 to retrieve one or more graphical objects from the graphical object database 150 that correspond to the type of data associated with the matched data timing information. The type of data associated with the matched data timing information may be determined by the graphics overlay controller 140, for example, based on the data type signal output from the data parser 110. In an alternative embodiment, the graphics overlay controller 150 may receive a signal from a buffer (e.g., data timing information buffer 112 or another buffer) which stores other types of header information for the data packets, including data type information.

Data Timing Information Buffer

In one example embodiment, the data timing information buffer 112 may also be called an event container, because it stores timing information that will be used to trigger a graphics overlay event based on data stored in the data buffer 114. In an example implementation, the data timing information buffer 112 stores an array of timing information and performs several functions including Add Events and Get Graphics Events for Timecode.

In an Add Event operation, timing information (DTi) output from the data parser 110 is stored in buffer 112, and may be sorted by timecode, e.g., timecodes are chronologically ordered in the array as indicated in the timecode sorting example discussed above. In this embodiment, the term "event" may be synonymous with timing information DTi. The same may also be performed with respect to the data stored in data buffer 114 in correspondence with the timing information stored in buffer 112.

Add Operation
For each event:
1. Get the correct place of the event in the array according to timecode
2. Insert the event in the correct place to keep the array sorted In a Get Graphics Events for Timecode operation, all timing information with a timecode less than a current time code are removed from the array in buffer 112, and the data stored in buffer 114 corresponding to the removed timecodes may also be removed.

Get Graphics Events for Timecode Operation
1. Create an empty array of events—"events to execute"
2. Execute algorithm for getting appropriate events for a certain timecode
3. Return the "events to execute" array.

Figure 6:
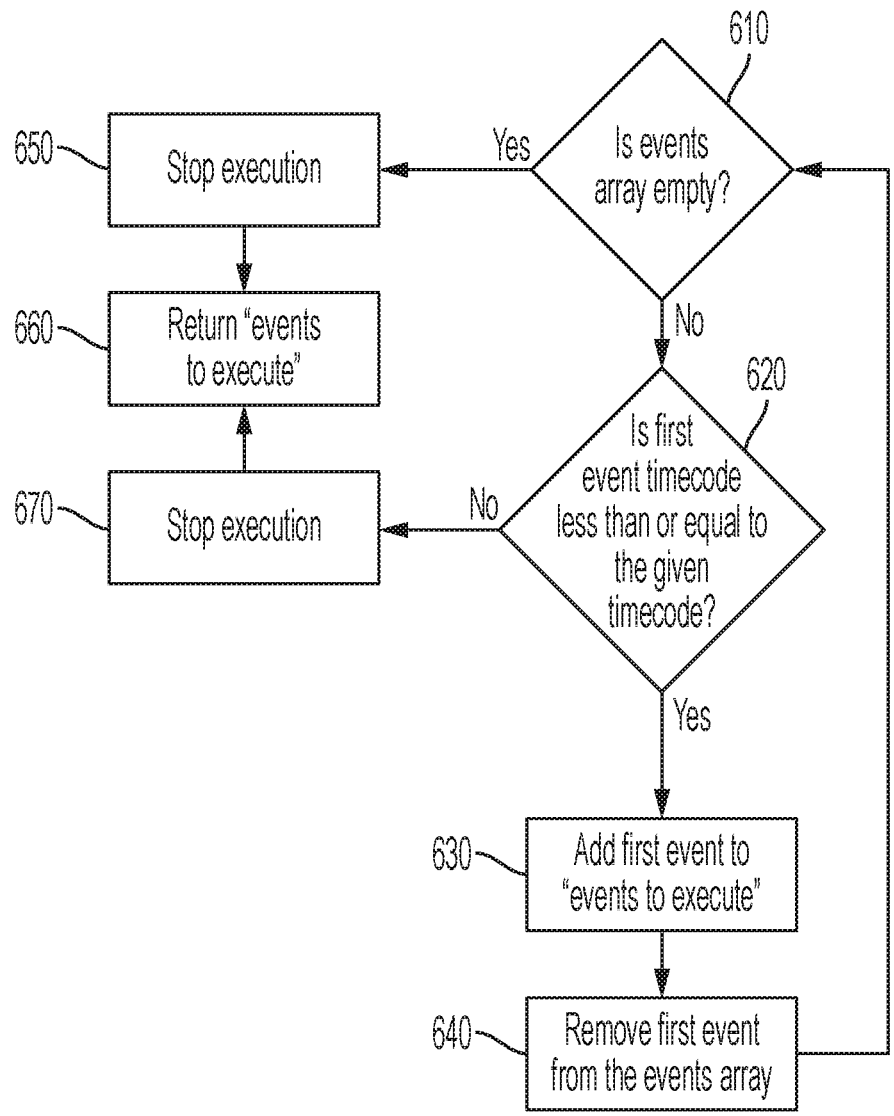
FIG. 6 shows an embodiment for getting graphics events for a certain timecode.

FIG. 6 shows an embodiment of the algorithm that may be run in the Get Graphics Events for Timecode Operation. Initially, the synchronizer 130 (either alone or under control of the medial player controller 106) determines whether the event container, or array, is empty (Block 610). If no empty, a determination is made as to whether the timecode of the first event stored in the event container is less than or equal to the given timecode (Block 620). If yes, then the first event is added to the events-to-execute process flow (Block 630). When executed (e.g., when the synchronizer 130 determines that the timing information CTi of the content frame equals the timecode of the first event, the graphics overlay is triggered), the first event is then removed from the events array (Block 640), and control returns to Block 610 for execution of additional events, if any. In one embodiment, all the events to be executed may be accumulated first and then they all may be sent for execution, not one-by-one.

If the events array in Block 610 is determined to be empty, execution stops (Block 650), and process flow returns to await receipt of future events or to perform another operation (Block 660). If the timecode of the first event is greater than the given timecode in Block 620, execution stops (Block 670) and process flow returns to await receipt of future events or to perform another operation (Block 660).

Self-Correcting Clock

The self-correcting clock 108 controls the synchronizer 130 by generating a corrected clock signal SCLK. The corrected clock signal SCLK maintains an accurate time count independent of the local clock of the user device 4 (e.g., local clock of the host processor 45), host processor loads, and browser activity of the user device 4. The self-correcting clock 108 may be controlled, for example, by the media player controller 106.

The self-correcting clock 108 starts running from a predetermined time, e.g., the time indicated by the first timing information stored in buffer 112. Put differently, the self-correcting clock may start running from the time DTi of the timed metadata (e.g., PDT tag, ID3 tag, or other timing information) of the first data parsed by parser 110 arrives and is stored. When new data arrives with new timing information to be stored in buffer 112, this timing information is used to update the self-correcting clock 108 and the clock continues to run from that time. If the stream or VOD is paused or stopped for any reason (e.g. user-initiated, because of buffering, delays, etc.), the self-correcting clock 108 is also paused or stopped. Then, when video playback resumes, the clock also resumes, all under control of the media player controller 106. Through use of the self-correcting clock 108, accurate time of a live video stream may be attained. For VOD, the self-correcting clock 108 may simply return to the current video time, as explained above.

In one embodiment, the self-correcting clock 108 may be updated based on the time (e.g., the PDT or ID3 tag) corresponding to one or more previously played video chunks plus the duration of the previous chunks.

The self-correcting clock 108 may be implemented in various ways. For example, a web browser of the user device 4 may be used to implement a running clock or timer that corresponds to the self-correcting clock 108. Such an implementation may include a variable that keeps track of the current/elapsed time and a function that runs every X seconds and increments the time variable by X.

Such a web browser may use a programming language such as JavaScript, which is single-threaded. This means that only one line of code can run at a time and the host processor 45 (e.g., CPU) allocates the run time and decides what will run next. While such a browser may be used in one embodiment, a problem may arise where the delay between clock ticks is not accurate and depends on other code that can run before it. This kind of drift is accumulated over time and may make the clock inaccurate. An improved embodiment which overcomes this problem implements self-correcting clock 108 to save its start time, calculates its drift, and compensate in a shorter delay time.

Another problem with a browser implementation relates to different CPU time dedication and Idle times. For example, the host processor 45 (or CPU) may decide which line of code will run next. If the browser is inactive (e.g., minimized or another tab is selected), the CPU might not run the clock increment, which could adversely affect clock accuracy. An improved embodiment which overcomes this problem implements self-correcting clock 108 using a browser feature known as "Web Worker."

Web Worker simulates a separate thread and is unaffected by browser inactivity. It maintains the running of an accurate and independent interval every certain number of milliseconds. The worker and the clock communicate with each other through messages.

Figure 7:
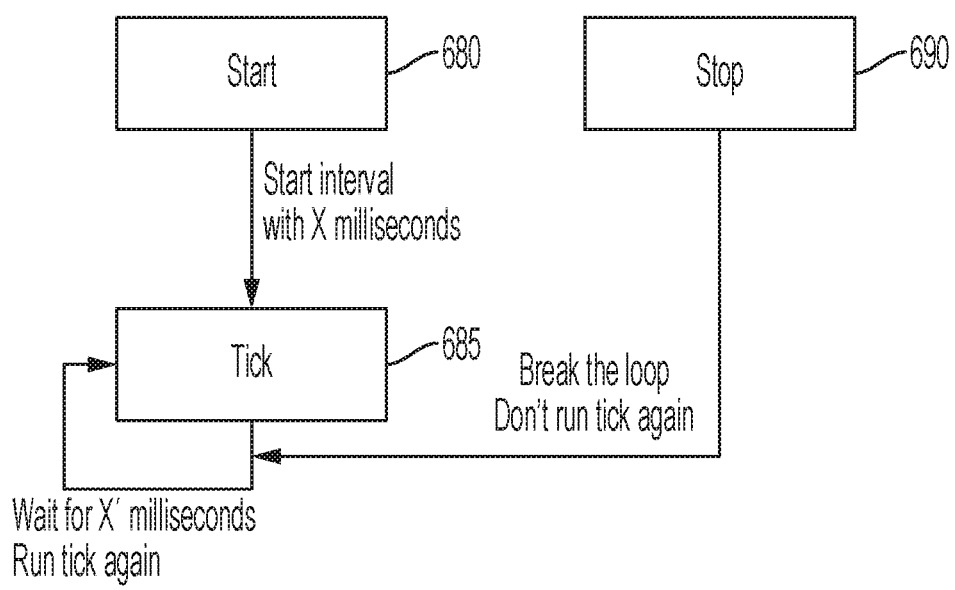
FIG. 7 shows an embodiment of the operation of a self-correcting clock.

FIG. 7 shows an embodiment of the operation of self-correcting clock 108 based on Web Worker. In operation, the interval of the clock is started with X milliseconds (Block 680). The tick of the clock is then implemented (Block 685) in operations 1 through 8 below. At any time, the user or system may pause or stop the clock 108 (Block 690).

1. Accumulated=Accumulated+X
2. Ticked at=current system time
3. Elapsed time=Ticked at−Started at
4. Drifted=Elapsed time−Accumulated
5. Send X to the clock
6. X'=X−drifted
7. Wait for X'
8. Go to 1

In one embodiment, the self-correcting clock 108 may operate based on Web Worker and a current time variable. Each time the clock 108 gets a message from the Web Worker with a value, the clock 108 increments its time by that value. In this case, the clock 108 may perform the following functions: Start, Stop, Set. The Start function sends a start message to Web Worker. The Stop message sends a stop message to Web Worker. The Set function sets a new time on the clock 108.

Graphics Overlay

The graphical object database 150 may store graphical objects which include, for example, text, images, photographs, video clips, animations, graphics interchange format (GIF) objects, and other forms of visual information. The graphical objects may be, for example, ones that correspond to a web developer tool. For example, the graphical objects may be HTML 5 graphics and may be rendered in like manner.

The graphics overlay controller 140 generates configuration information for the graphical objects retrieved from the graphical object database 150. The configuration information may designate the size, scale, color, shape, format, 2D, 3D, appearance, or any other feature related to the data to be displayed. In the car race example previously discussed, the graphical object may be a speedometer having graphics or numeral information that changes at the speed of the car (indicated in subsequent buffered data packets at subsequent time codes) shown on the video changes. The synchronization performed by the synchronizer 130 enables this correlation to take place in real-time, near real-time, or otherwise to recreate a dynamic, customized viewing experience.

The configuration information may be determined, for example, by one or more user settings stored in a memory of the host processor 45, based on selections from media player or user interface menus, and/or default or other control information stored by the media player controller.

When there is no match between the data timing information DTi and the content timing information CTi, the synchronizer does not output the Event signal. When no event signal is output, the data and graphics overlay currently displayed on the user interface continues to be displayed over the content, which may be continuously changing. (When the content is not video (e.g., a 360° image), the content may not continuously change, e.g., may change only when a user input indicates that the image should be rotated or changed or otherwise manipulated). In one embodiment, the data and graphics overlay is displayed over the content on the user interface until there is a match or for at least a predetermined time.

The render engine 160 renders the graphical object(s) to be displayed based on the configuration information output from the graphics overlay processor 140 (Block 545). The rendered graphics overlay(s) are then input to the display 44 in synchronism with the content output from the data controller 43. The self-correcting clock SCLK may be used as a basis for synchronizing the output of the display controller 43 and the output of the render engine so the content, data, and graphics overlays are simultaneously and accurately displayed. In one embodiment, the data controller 43 may manipulate the content to be output on the user interface based on a control signal from the media player controller, a user input, and/or other information.

The location, appearance, and/or arrangement of the rendered graphical objects may be determined, for example, by the graphics overlay controller 140, render engine 160, or the display controller 43 based on one or more stored user settings or preferences. The location, appearance, and/or arrangement of the rendered graphical overlays may also be determined based on signals from a user device, received prior to or during display of the content, data, and graphics overlays. This may be accomplished, for example, by making appropriate selections in menus or control icons programmed into the media player software and/or media player controller. The display controller 43, graphics overlay controller 140, and/or render engine 160 may communicate with the media player controller to receive these selections and/or other information.

The media player 100 may include additional features to enhance the interactive viewing experience and customization. For example, the graphics overlays displayed on the user interface may be in an active area on the screen that makes the overlays selectable based on a user input signal. The user input signal may be generated by a touch panel of the display 44 or another input device, e.g., mouse. When a graphics overlay is selected, the media player controller (or host processor 45) may receive the user input signal and perform one or more associated functions. These functions include, for example, changing the size, position, appearance, or functionality of the graphics overlay, replacing, modifying, or deleting the graphics overlay, or adding a graphics overlay associated with another type of data received in the input transport stream but, for example, not previously selected for display.

Figure 8:
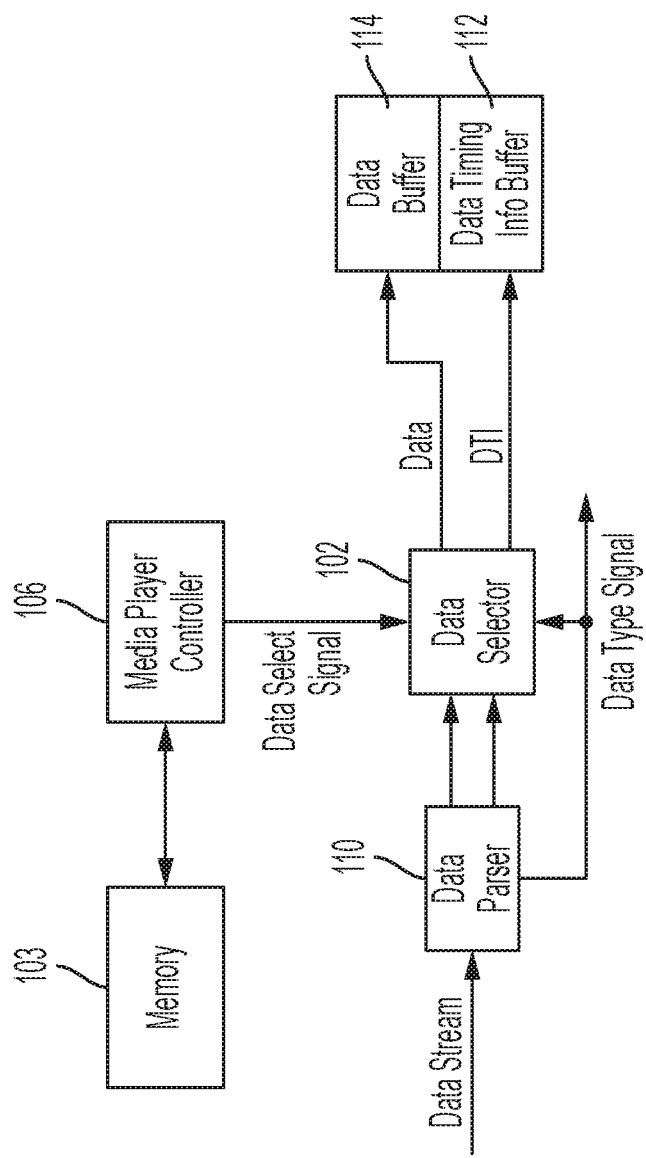
FIG. 8 shows an embodiment of a data selector for the media player.

When multiple types of data are included in the input stream from the server 5, the media player 100 may include a selector which filters out all packet data and header information that do not correspond to the type of data selected by the user. For example, as shown in FIG. 8, the media player 100 may include a data selector 102 which only passes data and its associated data timing information DTi (for storage in data buffer 114 and data timing information buffer 112, respectively) when the data type signal from the data parser 110 indicates that the data corresponds to one or more type(s) of data selected by a user, e.g., through input 48 through appropriate menu selections. The data types selected by the user may be indicated, for example, by a data select signal 111 sent from the media player controller 106 to the data selector 10. The data types indicated by the data select signal 111 may be preprogrammed into the control software of the media player 100 and/or based on user preferences and/or setting information stored in a memory 103 within or connected to the media player controller 106.

In another embodiment, the server 5 may include a data selector which filters out types of data which are not selected for viewing on the media player 100 of the user device 4. The data selector may operate based on user preference and/or setting information and/or predetermined information indicative of the types of data to be viewed on the media player 100. This information may be received from the media player controller 106, for example, based on selections made by the user and stored in a memory of the server 5. The information may be received by the server 5 prior to streaming the content and data to the user device 4 (e.g., at a time when a user logs in to the server 5 and orders the content for viewing), during streaming of the content and data to the user device 4, or both.

The data selector of this embodiment may significantly reduce the amount of data to be transmitted from the server 5 to the user device 4, and thus allow for a more efficient use of bandwidth. When the same content is being streamed to multiple user devices 4 simultaneously, a data selector may be provided for each user device. The data selectors may filter out different data in accordance with the user settings and preferences of each device user.

The media player 100, or host processor 45, may communicate with the controller 51 of the server 5 to perform various management and other operations. For example, the media player controller may control the display controller 43 to display windows or fields on the user interface of the media player 100 to receive log in or other authentication information. The media player 100, or host processor 45, may transmit the log in or authentication information (e.g., through a channel of input 41 or another channel) to the controller 51 for verification.

The media player 100, or host processor 45, may also receive software for the media player 100 from the controller 51 of the server 5, e.g., through a web browser or an appropriate interface. The software may be stored in the user device 4 (e.g., in an internal memory) at installation or for updating the media player software when an initial software has already been installed. The media player 100 may also receive notifications, alerts, advertisements, promotions, and other information from the server 5. The media player 100 may also transmit one or more user select signals to the server 5 as described herein for configuring or otherwise controlling operation of the media player and/or the content and data to be received for customized and interactive viewing.

Figure 9:
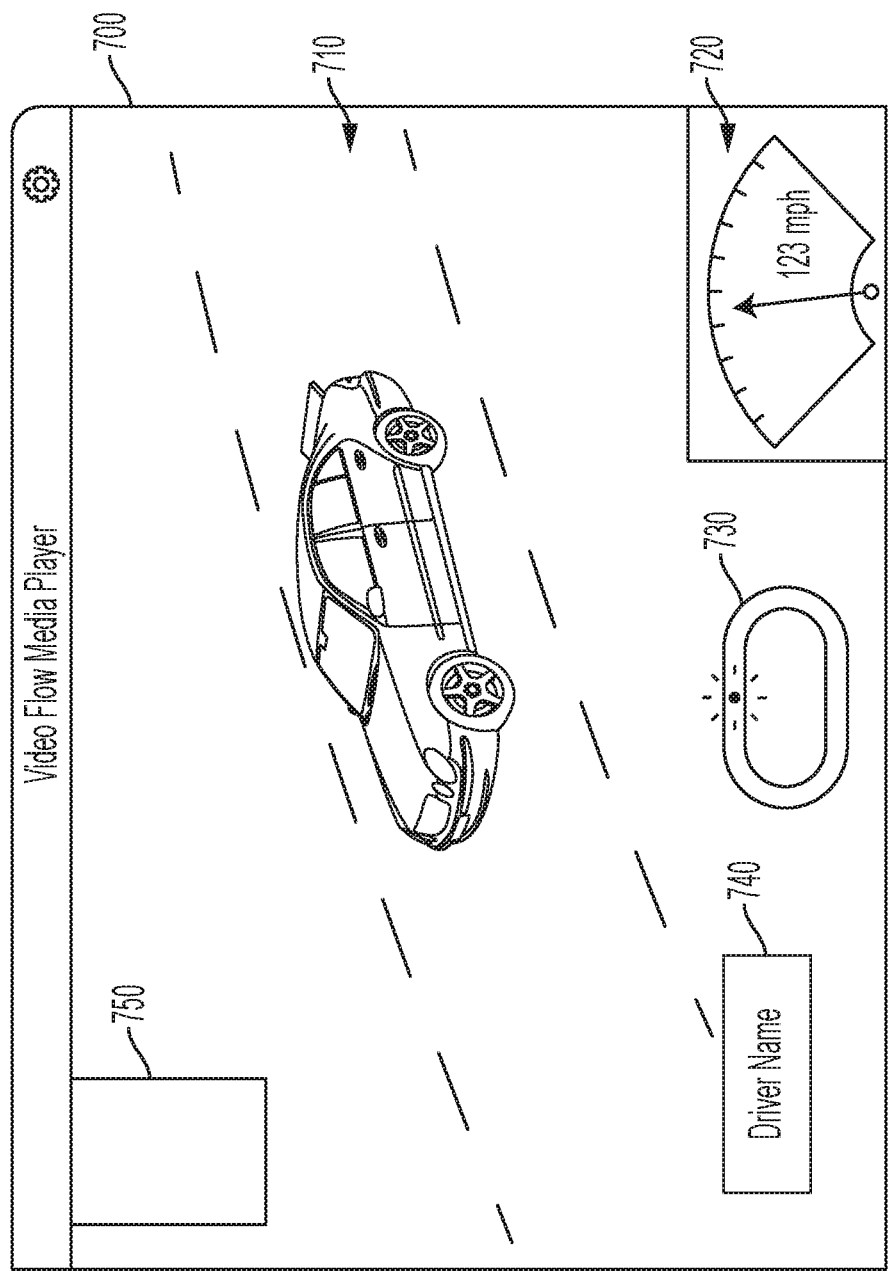
FIG. 9 shows an example of a user interface for the media player.

FIG. 9 shows an example of a user interface 700 that may be displayed on a media player 100 of a user device 4. The user interface 700 includes a plurality of graphics overlays on content displayed in content area 710. In this example, the content is live broadcast video of a car race. The graphics overlays are selected by a user for viewing out of multiple other types of data and graphics that can be overlaid. At any time, the graphics overlays may be selected and modified, deleted, or replaced as the race it taking place.

In this example, the graphics overlays include a speedometer 720, a race track location indicator 730, and the name of the driver 740 of the car shown in the displayed video frame. The speedometer 720 indicates the speed of the car synchronized to the video frame (or series of video frames) shown in the content area 710. The speedometer is expressed as a dynamic graphics overlay which changes by being synchronized (e.g., in real-time or otherwise) with received streamed data for subsequent video frames. The needle moves to indicate speed in an analog manner, and a numerical indication of the speed is displayed in association with the graphic overlay.

The race track location indicator 730 shows the position of the car at the time of the displayed video frame. This is achieved by synchronizing car location data to the video frame based on a comparison of timing information for the video frame and location data. The dot on the race track location moves in synchronization with movement of the car in subsequent video frames. The driver name is text data, which may be modified at any time to correspond to another driver. In one embodiment, changing the name of the driver may automatically change the location and speedometer to correspond to the car of that driver. This may be accomplished, for example, based on control operations performed by the data selector 102, media player controller 106, synchronizer 130, and/or other features of the embodiments previously described.

When used herein, "graphical object" or "graphics overlay" may refer to text, an image, a photograph, video, animation, a graphics interchange format (GIF) object, or any other form of visual information that is statically or dynamically displayed.

In one embodiment, data and their associated graphical objects may be initially displayed at default locations programmed into the media player software and then changed to locations designated by a user, e.g., based on an updated user control menu selection or by a dragging and dropping operation. At any time, a graphical overlay may be selected for modification. Example modifications include a change of color, size, location, or form of a graphical object, the frequency or period during which data and graphical object are to be displayed, the generation of alerts or notifications indicating certain times or events relating to the content, the addition or deletion of graphical objects and data before or during display of the content, as well as other modifications or settings.

The user interface 700 may be equipped with one or more control menus for allowing a user to customize the viewing experience. For example, a first menu may include a list of content and a second menu may include a list of data corresponding to content selected in first menu. The list of items in the menus may be updated based on information received from the server 5, especially when new live broadcasts are available for streaming to user devices. This may occur, for example, at login and/or other times, e.g., in response to push notifications or automatic downloads. Additionally, or alternatively, a user may, through the user interface 700, access a web page providing information on all of the content, live or otherwise, available for viewing.

The list of data in a menu may be downloaded from the server 5 and, for example, may be determined based on the type of information available from a corresponding data provider 3 for the selected content. A list of this data may be provided in a menu, as stated, and/or may be indicated in a configuration window based on information downloaded from the server 5. Such a configuration window may include a search field which allows users to input, for examples, names of players, drivers, games, or other specific information relating to the selected content. The configuration window may be more suitable for use when, for example, a very large amount of data is associated with the content.

When one or more selections are made from a menu or the configuration window, the media player controller 106, or host processor 45, stores this information for uploading to the server 5. The one or more selections may correspond to the select signal input into the controller 51 of the server 5, as previously described. The selections may be made before the content is displayed or during display of the content, even when the content is a live broadcast being streamed to a user device 4. This may allow a user to change, for example, the player, team, or other data, in the case where the content is a sporting event.

Also, as stated, the user interface 700 may include a log in window, for allowing users (e.g., subscribers) to log into the server 5 to perform various management, accounting, and payment functions, in addition to receiving software updates for the user interface, and viewing new content that is available, viewing demonstrations on what new features are being offered. The server 5 may also download advertising information, notifications, and alerts to users at this time.

Examples

Figure 10:
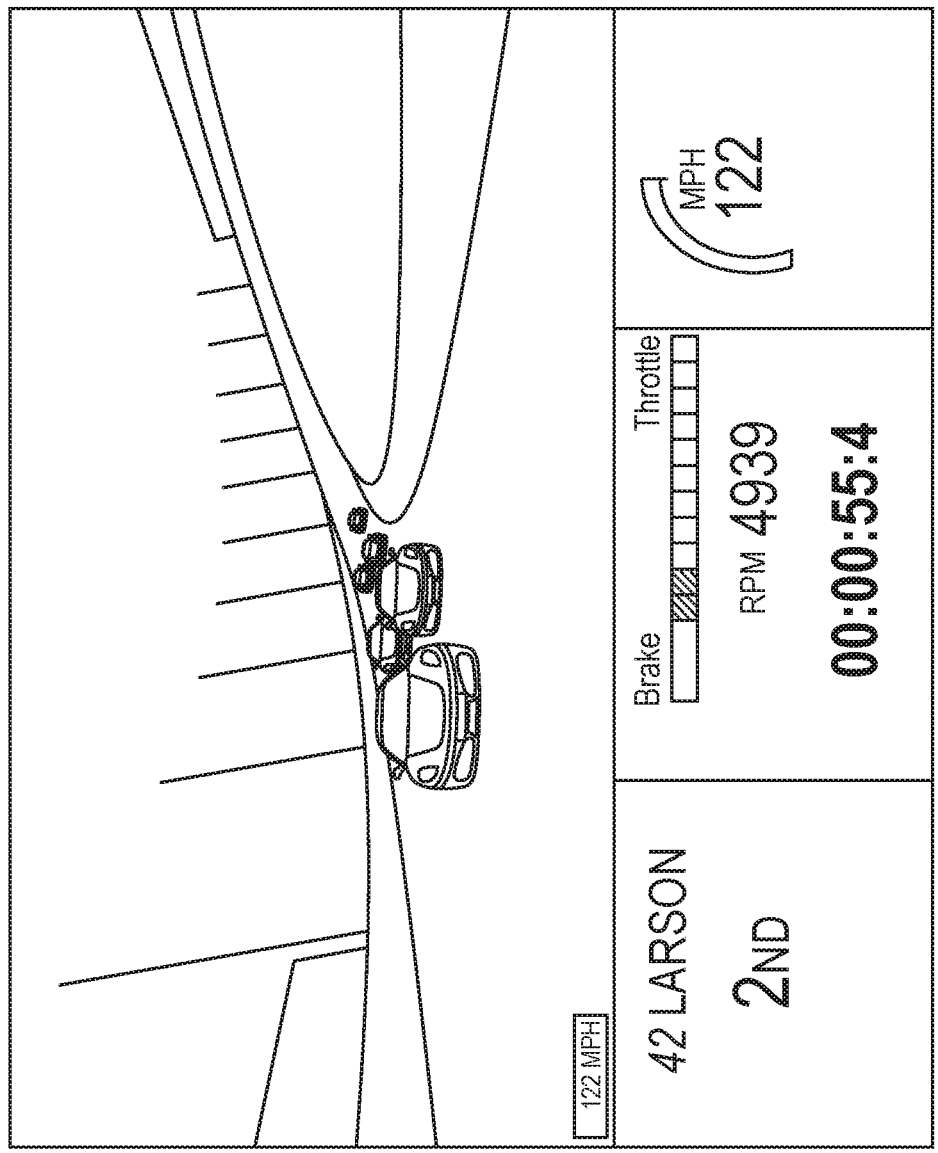
FIG. 10 shows an example of a screen shot of the user interface for a race.

FIG. 10 shows a screen shot of an embodiment of the user interface 700 implemented on a notebook computer during a car race. The user interface displays streaming video of a live broadcast of the race, and particularly the car of a certain driver (namely, the 42 car driven by Kyle Larson). The user interface 700 also includes graphics overlays corresponding to various types of data selected by the viewer on the media player controller 106.

One graphical object is of a speedometer that changes with the speed (e.g., telemetry and/or other types of sensor data from a data provider 2) of the car. The shaded arc-shaped area of the speedometer changes in real-time to indicate corresponding speed changes. At the time of the screen shot, the speed on the speedometer is synchronized to the displayed frame, made possible by the synchronizer 130 of the media player 100. For further customized viewing, a numerical indication of the speed is provided with the speedometer.

Another graphics overlay indicates RPM (revolutions per minute) for the car corresponding to the displayed frame. Another graphics overlay shows braking and throttle positions for the car for the displayed frame. Another graphics overlay shows the position of the car in the race at the time of the displayed frame. Other graphics overlays include the driver name, the number of the car, and a running timer indicative of the point in time of the race for the displayed frame.

Other possible data selections may have been, for example, car temperature, ambient temperature, track conditions, G forces on the driver, radio communications between driver and pit crew, a track map showing car position, and/or other information for customized viewing.

At any point during the race, the user interface 700 would allow the viewer to change, delete, or otherwise modify the types and numbers of graphics overlays and data to be shown. This may be accomplished, for example, by dragging and dropping the graphics overlays or any of the graphical objects in an overlay (in the case where a graphics overlay includes multiple graphical objects), by making appropriate selections in a menu or configuration window, or in other ways. In some embodiments, different camera feeds may be selectable by the viewer, in order to view the race at different vantage points or cars throughout the race. Video of the different camera feeds may be shown alone, or in combination with video from other camera feeds.

In one embodiment, the user interface 700 may display advertising or other information, either during the race or during a commercial break, if, for example, the content is of a television broadcast of a sporting or other event.

The embodiments described herein are sufficiently versatile that viewers on different user devices 4 may view different data and graphics overlays, and even different content. This versatility is achieved by synchronizing the data with the content at a point downstream of the content and data providers. This alleviates the need for the content providers to insert the data into their broadcast streams, saving them time and money and improving efficiency.

Also, because the embodiments are implemented downstream of the content and data providers, inserting metadata in the content and data streams may be avoided. As a result, the amount of processing to be performed at the server and the user device may be substantially reduced. This is especially beneficial in the case of live broadcasts streamed to user devices and where significant events in the content can take place in very short periods of time.

In addition, one or more embodiments described here compensate for different delays that might occur when multiple user devices receive the same content for viewing with synchronized data. For example, without synchronization, it is possible that multiple user devices receiving the same live video stream may play the video at different times. Thus, the timing of the video will be slightly off based on many variables, such as but not restricted to differences in device mobile reception, internet connection quality, and device hardware and processes running on the user devices and which consume memory. As a result, the viewer of each user deice may see the same frame in the video stream in a different time.

The embodiments described herein may be applied to various other applications. One example involves synchronized independent graphics overlay over a video stream for other sports, fashion, news, and virtual reality gaming and other applications. The other sports may be any sports where data and video may be synchronized, including but not limited to baseball, horse racing, basketball, football, Olympic events, hockey, and soccer. Non-sports applications include synchronizing graphics overlays over media content such as fashion shows, game shows, beauty pageants, and shopping, to name a few. Still other non-sports applications include news-related media, elections, political events, live reports, and weather-related media content.

In accordance with one or more embodiments, a media player is provided which synchronizes and triggers graphics overlay events with data specific for each user and, for example, by relying on clock signals SCLK from the self-correcting clock 108 of each device. Thus, the graphics overlay, data, and content will be accurately synchronized for viewing. Moreover, the graphics overlay events may be triggered from a center point may the broadcaster (or other content provider), which outputs the content with only a single timestamp or other timing information.

The methods, processes, and/or operations described herein may be performed by code or instructions to be executed by a computer, processor, controller, or other signal processing device. The computer, processor, controller, or other signal processing device may be those described herein or one in addition to the elements described herein.

Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, processors, logic, managers, parsers, filters, encoders/decoders, selectors, switches, multiplexers/demultiplexers, interfaces, engines, players, and other signal providing, signal generating, and signal processing features of the embodiments described herein may be implemented in non-transitory logic which, for example, may include hardware, software, or both. When implemented at least partially in hardware, the controllers, processors, logic, managers, parsers, filters, encoders/decoders, selectors, switches, multiplexers/demultiplexers, interfaces, engines, players, and other signal providing, signal generating, and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, controllers, processors, logic, managers, parsers, filters, encoders/decoders, selectors, switches, multiplexers/demultiplexers, interfaces, engines, players, and other signal providing, signal generating, and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions for implementing the operations of the methods, media players, servers, and other features of the embodiments described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments described herein.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other embodiments. The features of any one embodiment may be combined with features of one or more other embodiments described herein to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

The invention claimed is:

1. An interactive media player, comprising:
   an input interface configured to receive a user input signal;
   a receiver configured to receive content and data from a server;
   a synchronizer configured to synchronize the content and the data based on timing information corresponding to the content and a self-correcting clock of a user device upon which the media player is included, wherein the timing information includes timed metadata including a time at which video chucks included in the content were transmitted from the server;
   a graphics overlay processor configured to generate information indicative of a graphics overlay based on the data;
   a render engine configured to render the graphics overlay indicating the data synchronized to the content for display on a user interface, wherein the data synchronized to the content is selected based on the user input signal, and wherein a single thread executed by the user device updates the self-correcting clock based on a simulated separate thread executed by the user device that maintains a continuously updated interval independent of the self-correcting clock; and
   a display controller configured to utilize the updated self-correcting clock to control display of the data synchronized to the content,
   wherein the synchronizer is further configured to
      update the self-correcting clock to the time included in the timed metadata, and
      update, after updating the self-correcting clock to the time included in the timed metadata, the self-correcting clock to a time obtained by incrementing the time included in the time metadata by the continuously updated interval starting from the time included in the timed metadata.

2. A method for controlling an interactive media player, comprising:
   receiving a user input signal;
   receiving content and data from a server;
   synchronizing the content and the data based on timing information corresponding to the content and a self-correcting clock of a user device upon which the media player is included, wherein the timing information includes timed metadata including a time at which video chucks included in the content were transmitted from the server;
generating information indicative of a graphics overlay based on the data;
rendering the graphics overlay indicating the data synchronized to the content for display on a user interface, wherein the data synchronized to the content is selected based on the user input signal, and wherein a single thread executed by the user device updates the self-correcting clock based on a simulated separate thread executed by the user device that maintains a continuously updated interval independent of the self-correcting clock; and
utilizing the updated self-correcting clock to control display of the data synchronized to the content,
wherein the synchronizing of the content and the data includes:
updating the self-correcting clock to the time included in the timed metadata; and
updating, after updating the self-correcting clock to the time included in the timed metadata, the self-correcting clock to a time obtained by incrementing the time included in the time metadata by the continuously updated interval starting from the time included in the timed metadata.

3. A server, comprising:
a multiplexer configured to generate a transport stream for download to a user device, the transport stream including content, first timing information corresponding to the content, data corresponding to the content, and second timing information corresponding to the data, wherein the first timing information includes timed metadata including a time at which video chucks included in the content were transmitted to the user device; and
a controller configured to download a media player to the user device, the media player including:
a synchronizer configured to synchronize the data and content based on the first timing information, the second timing information, and a self-correcting clock of the user device,
a graphics overlay processor configured to generate information indicative of a graphics overlay based on the data,
a render engine configured to render the graphics overlay indicating the data synchronized to the content for display on a user interface, wherein a single thread executed by the user device updates the self-correcting clock based on a simulated separate thread executed by the user device that maintains a continuously updated interval independent of the self-correcting clock, and
a display controller configured to utilize the updated self-correcting clock to control display of the data synchronized to the content,
wherein the synchronizer is further configured to
update the self-correcting clock to the time included in the timed metadata, and
update, after updating the self-correcting clock to the time included in the timed metadata, the self-correcting clock to a time obtained by incrementing the time included in the time metadata by the continuously updated interval starting from the time included in the timed metadata.

4. The server of claim 3, wherein:
the data and the content change over time, and
the synchronizer is configured to synchronize changes in the data with corresponding changes in the content for display on the user interface.

5. The server of claim 4, wherein the render engine is configured to update rendering of the graphics overlay based on changes in the data over time.

6. The server of claim 3, wherein:
the content is received with first timing information,
the data is received with second timing information, and
the synchronizer is configured to synchronize the content and the data based on the first timing information and the second timing information.

7. The server of claim 6, wherein:
the content includes streaming video,
the data includes statistical information corresponding to the streaming video that changes during display of the streaming video, and
the synchronizer is further configured to synchronize the statistical information with the streaming video on a frame basis.

8. The server of claim 7, further comprising:
a first storage area configured to store the data selected by a user input signal;
a second storage area configured to store the second timing information in association with the data stored in the first storage area;
a third storage area configured to store frames of the streaming video in succession; and
a fourth storage area configured to store the first timing information in association with respective ones of the frames stored in the third storage area.

9. The server of claim 8, wherein the synchronizer is further configured to:
compare the first timing information stored in the fourth storage area for each respective ones of the frames stored in the third storage area with the second timing information stored in the second storage area for the data stored in the first storage area, and
output a control signal and an event signal when the first timing information matches the second timing information for one of the frames.

10. The server of claim 9, wherein:
the control signal initiates an outputting of the matched data to the render engine, and
the event signal triggers the graphics overlay processor to generate the information indicative of the graphics overlay.

11. The server of claim 10, wherein:
the graphics overlay processor is configured to generate information indicating how a graphical object corresponding to the matched data is to be overlaid on display of the matched frame.

12. The server of claim 3, further comprising:
a data selector configured to select the data from an input stream based on a user input signal and to filter out other data in the input stream that corresponds to the content but that is not selected based on the user input signal.

13. The server of claim 3, wherein the graphics overlay is selectable for modification, deletion, or replacement.

14. The server of claim 3, wherein the content includes a 360° image.

15. The server of claim 3, wherein the synchronizer is further configured to
update, after updating the self-correcting clock obtained by incrementing the time included in the time metadata by the continuously updated interval starting from the time included in the timed metadata, the self-correcting clock to a time at which additional video chucks included in additional content ordered in playback after the video chunks included in the content were broadcasted from the server.

16. The server of claim 3, wherein the timed metadata appears in the timing information as one of #EXT-X-PROGRAM-DATE-TIME (PDT) tag, IDS tag, or SMPTE Time Code, and
wherein the timed metadata indicates a real time in which the video chunks were broadcasted from the server.

17. A method for synchronizing graphics overlay on video, the method comprising:
synchronizing a video stream and data based on timing information corresponding to the video stream and a self-correcting clock of a user device upon which a media player is included, wherein the timing information includes timed metadata including a time at which video chucks included in the videos stream were transmitted;
receiving graphics based on the data; and
overlaying the graphics on the video stream, wherein the data is synchronized to the video stream based on a user input signal,
wherein a single thread executed by the user device updates the self-correcting clock based on a simulated separate thread executed by the user device that maintains a continuously updated interval independent of the self-correcting clock,
wherein the media player utilizes the updated self-correcting clock for outputting the data synchronized to the video stream, and
wherein the synchronizing of the video stream and data includes:
updating the self-correcting clock to the time included in the timed metadata; and
updating, after updating the self-correcting clock to the time included in the timed metadata, the self-correcting clock to a time obtained by incrementing the time included in the time metadata by the continuously updated interval starting from the time included in the timed metadata.

18. A non-transitory computer-readable medium having embodied thereon a program, which when executed by at least one processor of a user device causes the user device to execute a method for controlling an interactive media player, the method comprising:
receiving a user input signal;
receiving content and data from a server;
synchronizing the content and the data based on timing information corresponding to the content and a self-correcting clock of the user device upon which the media player is included, wherein the timing information includes timed metadata including a time at which video chucks included in the content were transmitted from the server;
generating information indicative of a graphics overlay based on the data; and
rendering the graphics overlay indicating the data synchronized to the content for display on a user interface, wherein the data synchronized to the content is selected based on the user input signal,
wherein a single thread executed by the user device updates the self-correcting clock based on a simulated separate thread executed by the user device that maintains a continuously updated interval independent of the self-correcting clock,
wherein the media player utilizes the updated self-correcting clock for outputting the data synchronized to the content, and
wherein the synchronizing of the content and data includes:
updating the self-correcting clock to the time included in the timed metadata; and
updating, after updating the self-correcting clock to the time included in the timed metadata, the self-correcting clock to a time obtained by incrementing the time included in the time metadata by the continuously updated interval starting from the time included in the timed metadata.

19. The non-transitory computer-readable medium of claim 18, wherein:
the data and the content change over time, and
synchronizing the data and content includes synchronizing changes in the data with corresponding changes in the content for display on the user interface.

20. The non-transitory computer-readable medium of claim 19, further comprising:
updating rendering of the graphics overlay based on changes in the data over time.

21. The non-transitory computer-readable medium of claim 18, wherein:
the content is received with first timing information,
the data is received with second timing information, and
the content and the data are synchronized based on the first timing information and the second timing information.

22. The non-transitory computer-readable medium of claim 21, wherein:
the content includes streaming video,
the data includes statistical information corresponding to the streaming video that changes during display of the streaming video, and
synchronizing the content and data includes synchronizing the statistical information with the streaming video on a frame basis.

23. The non-transitory computer-readable medium of claim 18, further comprising:
selecting the data from an input stream based on the user input signal, and
filtering out other data in the input stream that corresponds to the content but that is not selected by the user input signal.

24. The non-transitory computer-readable medium of claim 18, wherein the graphics overlay is selectable for modification, deletion, or replacement.

25. The non-transitory computer-readable medium of claim 18, wherein the content includes a 360° image.

26. The non-transitory computer-readable medium of claim 18, wherein the executed method further comprises:
synchronizing the content and the data based on the timed metadata included in the content; and
synchronizing the content and the data based on the self-correcting clock starting from the time included in the timed metadata.

27. The non-transitory computer-readable medium of claim 18, wherein, when updating the self-correcting clock to the time obtained by incrementing the time included in the time metadata by the continuously updated interval starting from the time included in the timed metadata, the self-correcting clock is not updated to the time included in the timed metadata.

28. The non-transitory computer-readable medium of claim 18, wherein the executed method further comprises:
storing the data received from the server in a buffer; and
outputting the data from the buffer for rending the graphics overlay only when the timing information corresponds to a current video frame that is to be displayed.

29. The non-transitory computer-readable medium of claim 18, wherein the executed method further comprises:
updating, after updating the self-correcting clock obtained by incrementing the time included in the time metadata by the continuously updated interval starting from the time included in the timed metadata, the self-correcting clock to a time at which additional video chucks included in additional content ordered in playback after the video chunks included in the content were broadcasted from the server.

30. The non-transitory computer-readable medium of claim 18, wherein the timed metadata appears in the timing information as one of #EXT-X-PROGRAM-DATE-TIME (PDT) tag, IDS tag, or SMPTE Time Code, and
wherein the timed metadata indicates a real time in which the video chunks were broadcasted from the server.

31. The non-transitory computer-readable medium of claim 18, wherein the self-correcting clock is updated to the time included in the time metadata only at the time at which video chunks included in the content were transmitted from the server and is updated to the time obtained by incrementing the time included in the time metadata by the continuously updated interval starting from the time included in the timed metadata for all times other than the time at which video chunks included in the content were transmitted from the server.

* * * * *